United States Patent
Vishwakarma et al.

(10) Patent No.: US 10,936,464 B2
(45) Date of Patent: Mar. 2, 2021

(54) METHOD AND SYSTEM FOR COUNTERING CAPACITY SHORTAGES ON STORAGE SYSTEMS

(71) Applicant: EMC IP Holding Company LLC, Hopkinton, MA (US)

(72) Inventors: Rahul Deo Vishwakarma, Bangalore (IN); Jayanth Kumar Reddy Perneti, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/525,556

(22) Filed: Jul. 29, 2019

(65) Prior Publication Data

US 2021/0034494 A1 Feb. 4, 2021

(51) Int. Cl.
*G06F 11/34* (2006.01)
*G06F 3/06* (2006.01)

(52) U.S. Cl.
CPC .......... *G06F 11/3442* (2013.01); *G06F 3/064* (2013.01); *G06F 3/0608* (2013.01); *G06F 3/0617* (2013.01); *G06F 3/0631* (2013.01); *G06F 3/0647* (2013.01); *G06F 3/0689* (2013.01); *G06F 2201/84* (2013.01)

(58) Field of Classification Search
CPC .. G06F 11/3442; G06F 3/0608; G06F 3/0617; G06F 3/0631; G06F 3/064; G06F 3/0647; G06F 3/0689; G06F 2201/84
See application file for complete search history.

(56) References Cited

U.S. PATENT DOCUMENTS

| | | | | |
|---|---|---|---|---|
| 9,477,407 | B1 * | 10/2016 | Marshak | G06F 3/061 |
| 2015/0127618 | A1 * | 5/2015 | Alberti | G06F 8/63 |
| | | | | 707/678 |
| 2016/0224660 | A1 * | 8/2016 | Munk | G06F 16/316 |
| 2016/0291876 | A1 * | 10/2016 | Alatorre | G06F 3/0644 |
| 2019/0272113 | A1 * | 9/2019 | Chamness | G06F 3/0659 |
| 2020/0150897 | A1 * | 5/2020 | Guturi | G06F 3/0659 |

OTHER PUBLICATIONS

P. C. L. Silva, H. J. Sadaei, R. Ballini and F. G. Guinnaraes, "Probabilistic Forecasting With Fuzzy Time Series," in IEEE Transactions on Fuzzy Systems, Jun. 11, 2019. doi: 10.1109/TFUZZ.2019.2922152. (Year: 2019).*

* cited by examiner

*Primary Examiner* — Edward J Dudek, Jr.
*Assistant Examiner* — Ralph A Verderamo, III
(74) *Attorney, Agent, or Firm* — Chamberlain, Hrdlicka, White, Williams & Aughtry

(57) ABSTRACT

A method and system for countering capacity shortages on storage systems. Specifically, the method and system disclosed herein entail proactively performing countermeasures directed to freeing-up storage capacity on storage systems. The countermeasures may be deployed based on forecasts projecting the future consumption of storage capacity on the storage systems.

18 Claims, 5 Drawing Sheets

METHOD AND SYSTEM FOR COUNTERING CAPACITY SHORTAGES ON STORAGE SYSTEMS

BACKGROUND

Numerous issues may plague, and subsequently cause failures to occur on, backup storage systems. One such issue pertains to the unexpected consumption of available storage capacity thereon. Current strategies directed to thwarting this issue, including existing capacity forecasting solutions and the manual performance of capacity reclamation by users and administrators, remain substantively ineffective.

SUMMARY

In general, in one aspect, the invention relates to a method for countering capacity shortages on storage arrays. The method includes generating a first forecast time-series projecting a first future consumption of capacity on a storage array spanning a first forecast duration, identifying a first forecast time-series maximum of the first forecast time-series, making a first determination that the first forecast time-series maximum exceeds a first used capacity threshold, and performing, based on the first determination, a first set of countermeasures affecting the capacity on the storage array.

In general, in one aspect, the invention relates to a non-transitory computer readable medium (CRM). The non-transitory CRM includes computer readable program code, which when executed by a computer processor, enables the computer processor to generate a first forecast time-series projecting a first future consumption of capacity on a storage array spanning a first forecast duration, identify a first forecast time-series maximum of the first forecast time-series, make a first determination that the first forecast time-series maximum exceeds a first used capacity threshold, and perform, based on the first determination, a first set of countermeasures affecting the capacity on the storage array.

In general, in one aspect, the invention relates to a system. The system includes a storage array, and a computer processor operatively connected to the storage array, and configured to generate a forecast time-series projecting a future consumption of capacity on the storage array spanning a forecast duration, identify a forecast time-series maximum of the forecast time-series, make a determination that the forecast time-series maximum exceeds a first used capacity threshold, and perform, based on the determination, a set of countermeasures affecting the capacity on the storage array.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for countering capacity shortages on storage systems. Specifically, one or more embodiments of the invention entails proactively performing countermeasures directed to freeing-up storage capacity on storage systems. The countermeasures may be deployed based on forecasts projecting the future consumption of storage capacity on the storage systems.

Figure 1:
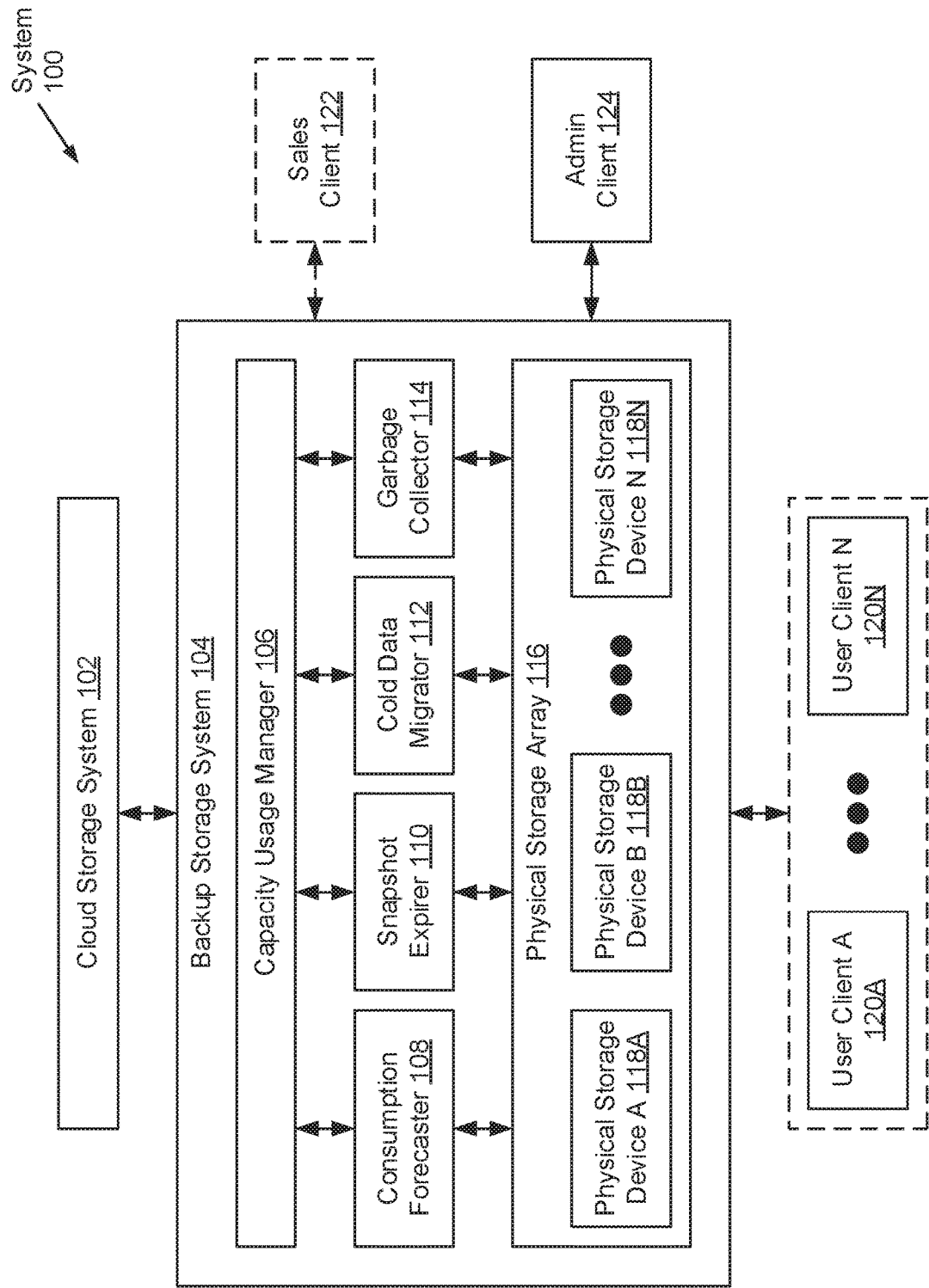
FIG. 1 shows a system in accordance with one or more embodiments of the invention.

FIG. 1 shows a system in accordance with one or more embodiments of the invention. The system (100) may include a cloud storage system (102) operatively connected to a backup storage system (104). The backup storage system (104) may, in turn, operatively connect to one or more user clients (120A-120N) and an admin client (124); and may or may not operatively connect to a sales client (122). Each of these system (100) components is described below.

In one embodiment of the invention, the above-mentioned system (100) components may operatively connect to one another through a network (not shown) (e.g., a local area network (LAN), a wide array network (WAN) such as the Internet, a mobile network, etc.). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, the cloud storage system (102) may represent a data backup, archiving, and/or disaster recovery storage system. The cloud storage system (102) may be implemented using one or more servers (not shown). Each server may be a virtual server, which may reside in a cloud computing environment. Additionally or alternatively, the cloud storage system (102) may be implemented using one or more virtual computing systems, which may emulate physical computing systems similar to the exemplary computing system shown in FIG. 6. Further, the cloud storage system (102) may consolidate various forms of data such as, for example, cold (i.e., never accessed) data and/or select accessed data that had once resided on the backup storage system (104).

In one embodiment of the invention, the backup storage system (104) may represent a data backup, archiving, and/or disaster recovery storage system. The backup storage system (104) may be implemented using one or more servers (not shown). Each server may be a physical server, which may reside in a datacenter. Additionally or alternatively, the backup storage system (104) may be implemented using one or more physical computing systems similar to the exemplary computing system shown in FIG. 6. Furthermore, the backup storage system (104) may include a capacity usage manager (106), a consumption forecaster (108), a snapshot expirer (110), a cold data migrator (112), a garbage collector (114), and a physical storage array (116). Each of these backup storage system (104) subcomponents is described below.

In one embodiment of the invention, the capacity usage manager (106) may refer to a computer program that may execute on the underlying hardware of the backup storage system (10.4) Specifically, the capacity usage manager (106) may be designed and configured to enact one or more countermeasures towards addressing a steady depletion of available storage capacity on the backup storage system (104). To that extent, the capacity usage manager (106) may perform any subset or all of the flowchart steps outlined in FIG. 2.

In one embodiment of the invention, the consumption forecaster (108) may refer to a computer program that may execute on the underlying hardware of the backup storage system (104). Specifically, the consumption forecaster (108) may be designed and configured to predict storage capacity consumption, on the backup storage system (104), for any given forecast window. To that extent, the consumption forecaster (108) may perform any subset or all of the flowchart steps outlined in FIG. 3.

In one embodiment of the invention, the snapshot expirer (110) may refer to a computer program that may execute on the underlying hardware of the backup storage system (104). Specifically, the snapshot expirer (110) may be designed and configured to expire directory snapshots (described below), which may be occupying limited storage capacity on the backup storage system (104). To that extent, the snapshot expirer (110) may perform any subset or all of the flowchart steps outlined in FIG. 4.

In one embodiment of the invention, the cold data migrator (112) may refer to a computer program that may execute on the underlying hardware of the backup storage system (104). Specifically, the cold data migrator (112) may be designed and configured to offload untouched (i.e., never accessed) data, occupying limited storage capacity on the backup storage system (104), to cloud-tiered storage (i.e., the cloud storage system (102)). To that extent, the cold data migrator (112) may perform any subset or all of the flowchart steps outlined in FIG. 5.

In one embodiment of the invention, the garbage collector (114) may refer to a computer program that may execute on the underlying hardware of the backup storage system (104). Specifically, the garbage collector (114) may be designed and configured to, periodically per a schedule or on-demand, reclaim (i.e., free-up) storage capacity on the backup storage system (104), which may no longer be in active use. Storage capacity that may be reclaimed may include, for example, storage capacity occupied by expired directory snapshots and storage capacity occupied by cold data. The garbage collector (114) is not limited to reclaiming storage capacity in accordance with the aforementioned examples. Further, one of ordinary skill will appreciate that the garbage collector (114) may perform other functionalities without departing from the scope of the invention.

In one embodiment of the invention, the physical storage array (116) may refer to a collection of one or more physical storage devices (118A-118N) on which various forms of data—e.g., backup copies of data found on the user client(s) (120A-120N)—may be consolidated. Each physical storage device (118A-118N) may encompass non-transitory computer readable storage media on which data may be stored in whole or in part, and temporarily or permanently. Further, each physical storage device (118A-118N) may be designed and configured based on a common or different storage device technology examples of which may include, but are not limited to, flash based storage devices, fibre channel (FC) based storage devices, serial-attached small computer system interface (SCSI) (SAS) based storage devices, and serial advanced technology attachment (SATA) storage devices. Moreover, in one embodiment of the invention, any subset or all physical storage device(s) (118A-118N) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, a user client (120A-120N) may represent any physical appliance or computing system designed and configured to receive, generate, process, store, and/or transmit data, as well as to provide an environment in which one or more computer programs may execute thereon. The computer programs may, for example, implement large-scale and complex data processing; or implement one or more services offered locally or over a network. Further, in providing an execution environment for any computer programs installed thereon, a user client (120A-120N) may include and allocate various resources (e.g., computer processors, memory, storage, virtualization, network bandwidth, etc.), as needed, to the computer programs and the tasks (or processes) instantiated thereby. One of ordinary skill will appreciate that a user client (120A-120N) may perform other functionalities without departing from the scope of the invention. Examples of a user client (120A-120N) may include, but are not limited to, a desktop computer, a laptop computer, a tablet computer, a server, a mainframe, or any other computing system similar to the exemplary computing system shown in FIG. 6.

In one embodiment of the invention, the sales client (122) may represent any physical appliance or computing system that may operate as a point-of-sale system for the procurement of products (i.e., physical or virtual components) and/or services directed to the maintenance and/or upgrade of the backup storage system (104). To the extent of interacting with the backup storage system (104), the sales client (122) may include functionality to receive procurement orders therefrom. A procurement order may represent an electronic request for the acquisition (e.g., purchase, delivery, and installation) of, for example, one or more physical storage devices (118A-118N) (described above), which may be used to supplement the available storage capacity on the backup storage system (104). One of ordinary skill will appreciate that the sales client (122) may perform other functionalities without departing from the scope of the invention. Examples of the sales client (122) may include, but are not limited to, a desktop computer, a laptop computer, a tablet computer, a server, or any other computing system similar to the exemplary computing system shown in FIG. 6.

In one embodiment of the invention, the admin client (124) may represent any physical appliance or computing system operated by one or more administrators of the backup storage system (104). An administrator of the backup storage system (104) may refer to an individual or entity whom may be responsible for overseeing backup storage system (104) operations and maintenance. To the extent of interacting with the backup storage system (104), the admin client (124) may include functionality to receive alert notifications therefrom. These alert notifications may pertain to informing the administrator(s) that the available storage capacity on the backup storage system (104) is nearing depletion, and accordingly, appropriate actions should be taken. One of ordinary skill will appreciate that the admin client (124) may perform other functionalities without departing from the scope of the invention. Examples of the admin client (124) may include, but are not limited to, a desktop computer, a laptop computer, a tablet computer, a server, a smartphone, or any other computing system similar to the exemplary computing system shown in FIG. 6.

While FIG. 1 shows a configuration of components, other system configurations may be used without departing from the scope of the invention.

Figure 2:
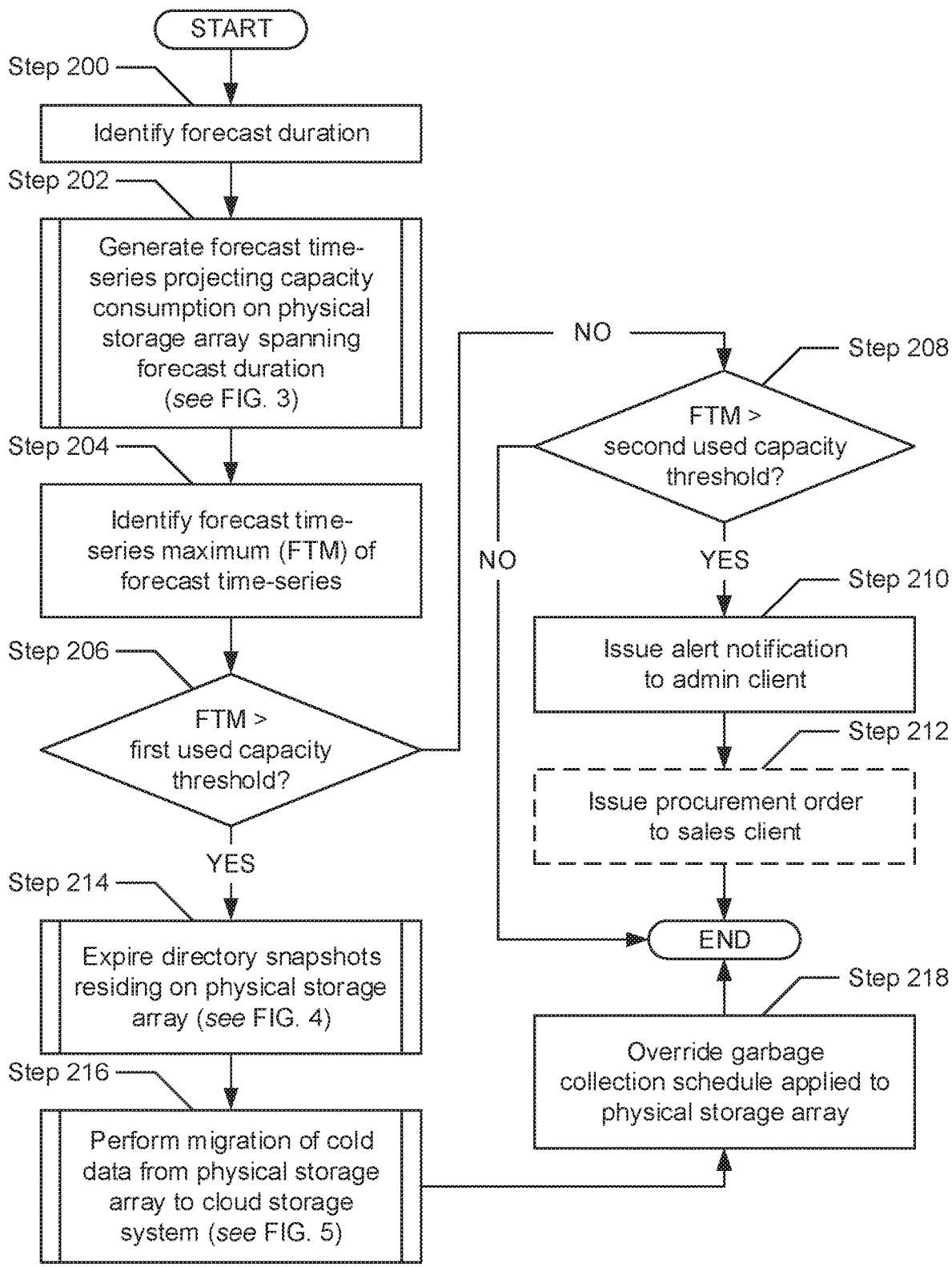
FIG. 2 shows a flowchart describing a method for countering capacity shortages on storage systems in accordance with one or more embodiments of the invention.

FIG. 2 shows a flowchart describing a method for countering capacity, shortages on storage systems in accordance with one or more embodiments of the invention. The various steps outlined below may be performed by the capacity usage manager residing on the backup storage system (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, a forecast duration is identified. In one embodiment of the invention, the forecast duration (also referred to as the forecast horizon) may refer to a length or amount of time into the future for which forecasts are to be prepared. The forecasts may be directed to storage capacity consumption on the backup storage system (or more specifically, the physical storage array thereon). Further, the forecast duration may be a backup storage system administrator defined value.

In Step 202, a forecast time-series is generated. In one embodiment of the invention, the forecast time-series may represent a series of values indexed in a specified future time order, which spans the forecast duration (identified in Step 200). Further, each value may capture an amount, percentage, or rate of storage capacity projected to be consumed at a corresponding future point in time. Generation of the forecast time-series is described in further detail below with respect to FIG. 3.

In Step 204, a forecast time-series maximum is identified. In one embodiment of the invention, the forecast time-series maximum may refer to the peak (or highest) value exhibited across the forecast time-series (generated in Step 202). The forecast time-series maximum may be further referred to as the measurement or observation used to deduce whether countermeasures, addressing storage capacity depletion, should be deployed on the backup storage system. Moreover, though a maximum value of the forecast time-series is disclosed as the measurement or observation throughout the instant method, other statistical markers (e.g., mean, median, etc.), representative of the exhibited forecast time-series values, may be used as the measurement or observation without departing from the scope of the invention.

In Step 206, a determination is made as to whether the forecast time-series maximum (identified in Step 204) exceeds a first used capacity threshold. A used capacity threshold may refer to an amount, percentage, or rate of storage capacity consumption that defines a value beyond which countermeasures, for addressing storage capacity depletion on the backup storage system, may be enacted. Further, a used capacity threshold (e.g., the first used capacity threshold) may be a backup storage system administrator defined value. Accordingly, in one embodiment of the invention, if it is determined that the forecast time-series maximum exceeds the first used capacity threshold, then the process proceeds to Step 214. On the other hand, in another embodiment of the invention, if it is alternatively determined that the forecast time-series maximum does not exceed the first used capacity threshold, then the process alternatively proceeds to Step 208.

In Step 208, after determining (in Step 206) that the forecast time-series maximum (identified in Step 204) does not exceed the first used capacity threshold (described above), a determination is made as to whether the forecast time-series maximum exceeds a second used capacity threshold. The second used capacity threshold, similar to the first used capacity threshold, may refer to an amount, percentage, or rate of storage capacity consumption that defines a value beyond which countermeasures, for addressing storage capacity depletion on the backup storage system, may be enacted. However, the countermeasures deployed upon meeting the second used capacity threshold may differ from the countermeasures deployed upon meeting the first used capacity threshold. Further, the value defining the second used capacity threshold may be a higher or greater value than the value defining the first used capacity threshold. Accordingly, in one embodiment of the invention, if it is determined that the forecast time-series maximum exceeds the second used capacity threshold, then the process proceeds to Step 210, On the other hand, if it is alternatively determined that the forecast time-series maximum does not exceed the second used capacity threshold, then the process alternatively ends.

In Step 210, after determining (in Step 208) that the forecast time-series maximum (identified in Step 204) does not exceed the second used capacity threshold (described above), an alert notification is issued. In one embodiment of the invention, the alert notification may be directed to an admin client (see e.g., FIG. 1) operated by administrators of the backup storage system. Further, the alert notification may pertain to informing the administrator(s) that the available storage capacity on the backup storage system is nearing depletion, and accordingly, appropriate actions should be taken. Hereinafter, the process may or may not proceed to Step 212 prior to ending. The former may transpire if the capacity usage manager, which is performing the instant method, includes the capability and permissions to interact with a sales client (see e.g., FIG. 1), and granted the sales client exists and is configured to receive and process requests from automated sources (e.g., the capacity usage manager).

In Step 212, a procurement order is issued. In one embodiment of the invention, the procurement order may be directed to a sales client (see e.g., FIG. 1), which may operate as a point-of-sale system for the procurement of products (i.e., physical or virtual components) and/or services geared for the maintenance and/or upgrade of the backup storage system. Further, the procurement order may represent an electronic request for the acquisition (e.g., purchase, delivery, and installation) of, for example, one or more physical storage devices, which may be used to supplement the depleting available storage capacity on the backup storage system.

In Step 214, after alternatively determining (in Step 206) that the forecast time-series maximum (identified in Step 204) exceeds the first used capacity threshold (described above), one or more directory snapshots is/are expired. In one embodiment of the invention, a directory snapshot may refer to a read-only copy of a given filesystem directory (or database) created at a given point in time, which may be used as a restore or rollback point for a given user client. Further, the expiration of a given directory snapshot may entail marking the given directory snapshot for deletion. The expiration of directory snapshots, on the backup storage system, is described in further detail below with respect to FIG. 4.

In Step 216, a migration of cold data is performed. In one embodiment of the invention, cold data may refer to any data, stored on the storage system, which may be infrequently or never accessed (or used). Further, the migration of cold data may entail the transfer or movement of the cold data from the backup storage system to cloud-tier storage (e.g., a cloud storage system (see e.g., FIG. 1)). Cold data migration is described in further detail below with respect to FIG. 5.

In Step 218, a garbage collection schedule, configured on the backup storage system, is overridden. In one embodiment of the invention, the garbage collection schedule may refer to a prescribed plan for executing garbage collection processes on the backup storage system (or more specifically, across the physical storage array thereon) based on specified times, a specified periodicity, or specified conditions. Garbage collection (i.e., a garbage collection process) may refer to the reclamation (i.e., freeing-up) of storage capacity on the physical storage array, which may no longer be in active use. Storage capacity that may be reclaimed may at least include storage capacity occupied by directory snapshots (expired in Step 214) and storage capacity occupied by cold data (migrated in Step 216). Furthermore, in overriding the garbage collection schedule, garbage collection may be invoked on-demand rather than awaiting for the execution of a next garbage collection process based on the times, periodicities, or conditions specified in the garbage collection schedule. Accordingly, the reclamation of storage capacity is immediate.

Figure 3:
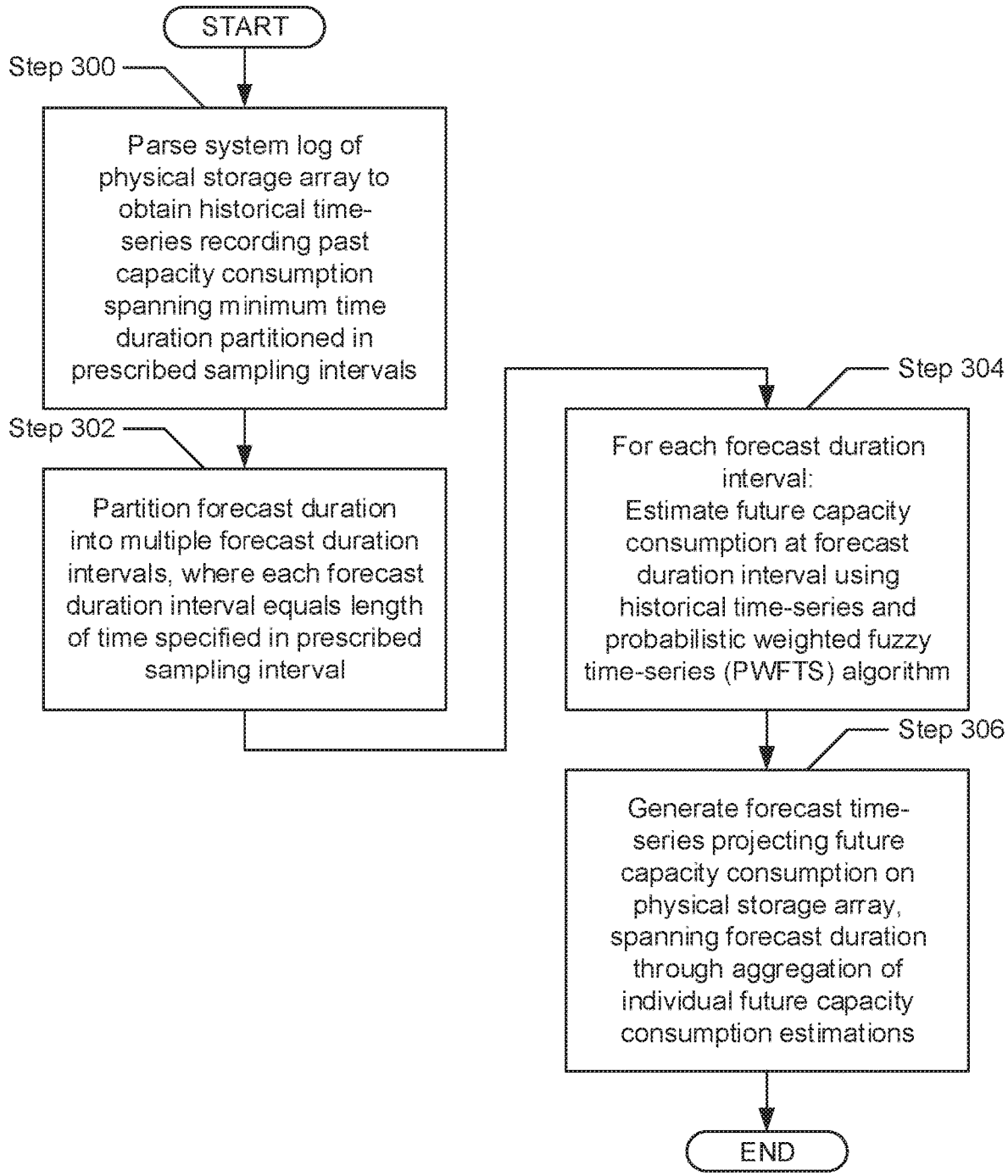
FIG. 3 shows a flowchart describing a method for generating a forecast time-series in accordance with one or more embodiments of the invention.

FIG. 3 shows a flowchart describing a method for generating a forecast time-series in accordance with one or more embodiments of the invention. The various steps outlined below may be performed by the consumption forecaster residing on the backup storage system (see e.g., FIG. 1) Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, a system log of the backup storage system is parsed. In one embodiment of the invention, the system log may represent a data object (e.g., a file, a table, a structure of arrays, a composite variable, etc.) that chronologically documents or records the utilization of backup storage system resources at prescribed sampling intervals. That is, the system log may maintain a point-in-time utilization history of one or more backup storage system resource types (e.g., compute resources, storage resources, virtualization resources, network resources, etc.).

In one embodiment of the invention, in parsing the system log, a historical time-series may be Obtained. The historical time-series may represent a series of values indexed in a specified past time order, which may span any given length of the point-in-time utilization history captured in the system log. The aforementioned given length of the point-in-time utilization history may include a minimum number of measurements, observations, or sampling points required to produce predictions based on the applied forecasting algorithm (described below). Further, each aforementioned value may depict an amount, a percentage, or a rate of which storage capacity, provided by the storage resources (i.e., physical storage array) of the backup storage system, has been consumed at a corresponding past point of time.

In Step 302, a forecast duration (described above see e.g., FIG. 2) is partitioned. Specifically, in one embodiment of the invention, the forecast duration may be segmented into multiple forecast duration intervals. Each forecast duration interval may span an amount or length of time equivalent to the prescribed sampling interval in which the point-in-time utilization history of one or more backup storage system resource types is recorded in the system log (parsed in Step 300).

In Step 304, for each forecast duration interval (defined in Step 302), a future amount, percentage, or rate of consumed storage capacity is estimated. That is, in one embodiment of the invention, storage capacity consumption may be projected for each forecast duration interval. Further, each projected value (i.e., consumed amount, percentage, or rate of storage capacity) may be estimated based on the historical time-series (obtained in Step 300) in conjunction with a known forecasting algorithm such as, for example, a probabilistic weighted fuzzy time-series (PWFTS) algorithm. PWFTS is a probabilistic forecasting algorithm, which considers fuzzy, and stochastic patterns on data (e.g., the historical time-series), to produce prediction intervals (or probability distributions). Details outlining the implementation of the PWFTS algorithm are outside the scope of embodiments of the invention and, therefore, will not be covered herein.

In Step 306, a forecast time-series is generated from the future consumption of storage capacity for each forecast duration interval (estimated in Step 304). In one embodiment of the invention, the forecast time-series may represent a series of values indexed in a specified future time order, which spans the forecast duration (partitioned in Step 302). Further, each value may capture an amount, a percentage, or a rate of which storage capacity may be consumed at a corresponding future point of time.

Figure 4:
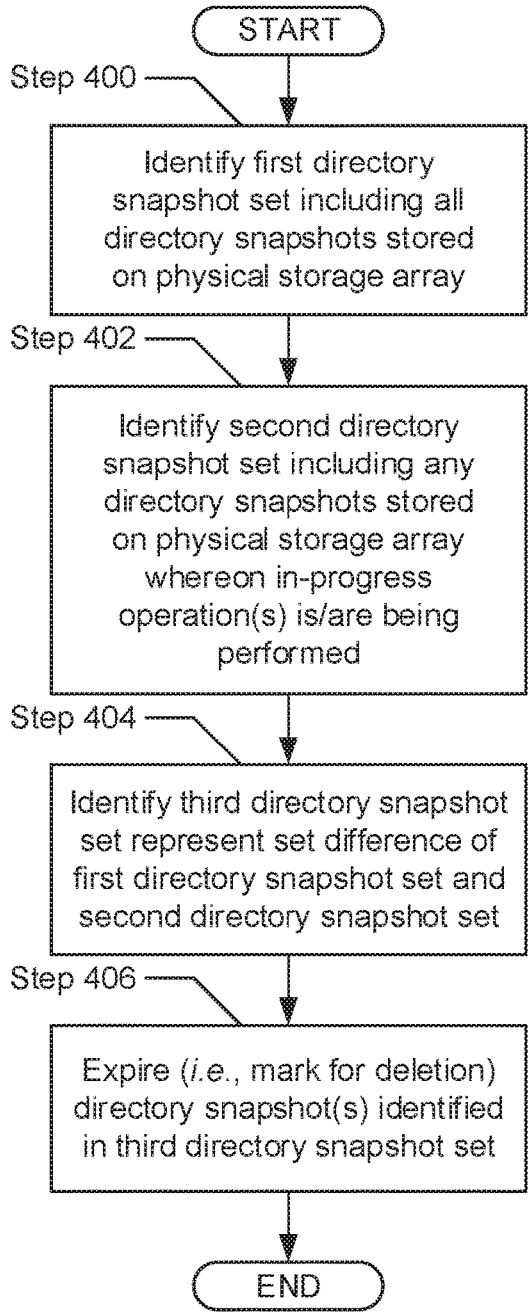
FIG. 4 shows a flowchart describing a method for expiring directory snapshots in accordance with one or more embodiments of the invention.

FIG. 4 shows a flowchart describing a method for expiring directory snapshots in accordance with one or more embodiments of the invention. The various steps outlined below may be performed by the snapshot expirer residing on the backup storage system (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, a first directory snapshot set is identified. In one embodiment of the invention, the first directory snapshot set may refer to a collection of directory snapshots (described above—see e.g., FIG. 2) encompassing each and every directory snapshot currently stored on the physical storage array of the backup storage system.

In Step 402, a second directory snapshot set is identified. In one embodiment of the invention, the second directory snapshot set may refer to another collection of directory snapshots currently stored on the physical storage array, which may encompass any directory snapshot currently being accessed or used by one or more in-progress operations. An in-progress operation, in turn, may refer to a user-initiated process (e.g., a data backup operation or a data restoration operation) or a system-initiated process (e.g., a garbage collection operation, a data migration operation, or a data replication operation) that may currently be executing, and therefore progressing towards completion, on the backup storage system.

In Step 404, a third directory snapshot set is identified. In one embodiment of the invention, the third directory snapshot set may refer to yet another collection of directory snapshots currently stored on the physical storage array, which may encompass one or more directory snapshots representative of a set difference of the first directory snapshot set (identified in Step 400) and the second directory snapshot set (identified in Step 402). That is, the third directory snapshot set may identify the complement set of the second directory snapshot set or, more precisely, may include a subset of stored directory snapshots not being currently accessed or used by one or more in-progress operations (described above).

In Step 406, each directory snapshot, of the third directory snapshot set (identified in Step 404), is expired. Specifically, in one embodiment of the invention, the directory snapshot(s) identified in the third directory snapshot set may each be marked for deletion.

Figure 5:
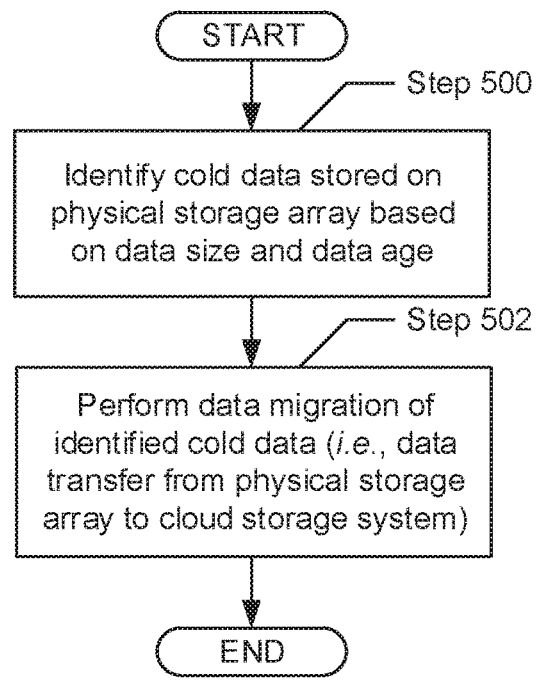
FIG. 5 shows a flowchart describing a method for migrating cold data in accordance with one or more embodiments of the invention.

FIG. 5 shows a flowchart describing a method for migrating cold data in accordance with one or more embodiments of the invention. The various steps outlined below may be performed by the cold data migrator residing on the backup storage system (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 5, in Step 500, cold data—currently stored on the physical storage array of the backup storage system—is identified. In one embodiment of the invention, cold data may refer to any stored data that which may be infrequently or never accessed (or used). Further, any given data stored on the physical storage array may be designated or identified as cold data based at least on a data size and/or a data age, associated with the given data, meeting or satisfying cold data criteria. The data size associated with a given data may refer to the amount of information, expressed in bytes, contained in the given data. On the other hand, the data age associated with a given data may refer to an amount or length of time that has elapsed since the given data has been stored on the physical storage array of the backup storage system.

In one embodiment of the invention, the above-mentioned cold data criteria may refer to one or more conditions for identifying cold data from any data stored on the backup storage system. The condition(s) may be enforced as a data migration policy or rule, which may be created and configured by a backup storage system administrator. By way of examples, the condition(s) imposed by the cold data criteria may include, but are not limited to, stored data of any data size, stored data having a data size larger than a first threshold data size, stored data having a data size smaller than a second threshold data size, stored data exhibiting any data age, stored data exhibiting a data age matching a specified data age, stored data exhibiting a data age within a specified range of data ages (e.g., between a specified minimum data age and a specified maximum data age), or any combination thereof.

In Step 502, a data migration of the cold data (identified in Step 500) is performed. In one embodiment of the invention, data migration may generally pertain to the movement, offloading, or copying of a given data from one storage location to another storage location. More specifically, however, the data migration of cold data may entail the transfer of the cold data from the physical storage array residing on the backup storage system to a cloud storage system (described above see e.g., FIG. 1).

Figure 6:
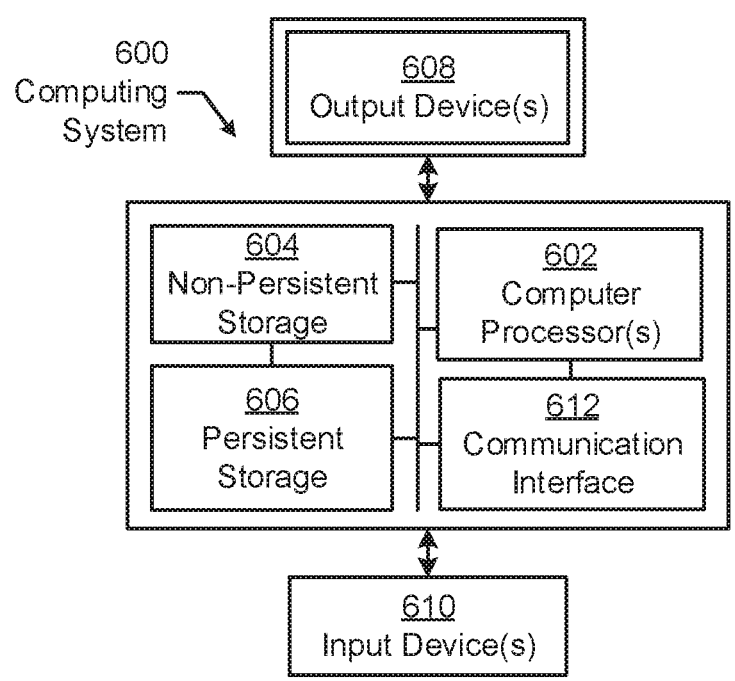
FIG. 6 shows a computing system in accordance with one or more embodiments of the invention.

FIG. 6 shows a computing system in accordance with one or more embodiments of the invention. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one embodiment of the invention, the computing system (600) may include one or more output devices (608), such as a screen (e.g., a liquid crystal display (LCD), a plasma display, touchscreen, cathode ray tube (CRT) monitor, projector, or other display device), a printer, external storage, or any other Output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for countering capacity shortages on storage arrays, comprising:
    generating a first forecast time-series projecting a first future consumption of capacity on a storage array spanning a first forecast duration;
    identifying a first forecast time-series maximum of the first forecast time-series;
    making a first determination that the first forecast time-series maximum exceeds a first used capacity threshold;
    performing, based on the first determination, a first set of countermeasures affecting a capacity on the storage array;
    generating a second forecast time-series projecting a second future consumption of capacity on the storage array spanning a second forecast duration;
    identifying a second forecast time-series maximum of the second forecast time-series;
    making a second determination that the second forecast time-series maximum does not exceed the first used capacity threshold;
    making a third determination, based on the second determination, that the second forecast time-series maximum exceeds a second used capacity threshold; and
    performing, based on the third determination, a second set of countermeasures affecting the capacity on the storage array.

2. The method of claim 1, wherein generating the first forecast time-series, comprises:
    parsing a system log to obtain a historical time-series recording a past consumption of capacity on the storage array spanning a specified time duration;
    partitioning the first forecast duration into a plurality of forecast duration intervals;
    for each forecast duration interval of the plurality of forecast duration intervals:
        estimating, for the forecast duration interval, a future consumption of capacity on the storage array using the historical time-series and a forecasting algorithm; and
    forming the first forecast time-series using the future consumption of capacity on the storage array for the plurality of forecast duration intervals in chronological order.

3. The method of claim 2, wherein the forecasting algorithm is a probabilistic weighted fuzzy time-series (PWFTS) algorithm.

4. The method of claim 1, wherein the first set of countermeasures comprises expiring a set of directory snapshots residing on the storage array.

5. The method of claim 4, wherein expiring the set of directory snapshots, comprises:
    identifying a first directory snapshot set comprising all directory snapshots residing on the storage array;
    identifying a second directory snapshot set comprising directory snapshots on which an in-progress operation is being performed;
    identifying the set of directory snapshots comprising a set difference of the first directory snapshot set and the second directory snapshot set; and
    marking each directory snapshot of the set of directory snapshots for deletion.

6. The method of claim 4, wherein the first set of countermeasures further comprises performing a data migration of cold data residing on the storage array.

7. The method of claim 6, wherein performing the data migration of cold data, comprises:
    identifying the cold data from data stored on the storage array based on a data size and a data age; and
    performing a data transfer of the cold data from the storage array to a cloud storage system.

8. The method of claim 6, wherein the first set of countermeasures further comprises overriding a garbage collection schedule implemented on the storage array.

9. The method of claim 1, wherein the second set of countermeasures comprises issuing an alert notification to an admin client.

10. The method of claim 9, wherein the second set of countermeasures further comprises issuing a procurement order to a sales client.

11. A non-transitory computer readable medium (CRM) comprising computer readable program code, which when executed by a computer processor, enables the computer processor to:
    generate a first forecast time-series projecting a first future consumption of capacity on a storage array spanning a first forecast duration;
    identify a first forecast time-series maximum of the first forecast time-series;
    make a first determination that the first forecast time-series maximum exceeds a first used capacity threshold;
    perform, based on the first determination, a first set of countermeasures affecting a capacity on the storage array;
    generate a second forecast time-series projecting a second future consumption of capacity on the storage array spanning a second forecast duration;
    identify a second forecast time-series maximum of the second forecast time-series;
    make a second determination that the second forecast time-series maximum does not exceed the first used capacity threshold;
    make a third determination, based on the second determination, that the second forecast time-series maximum exceeds a second used capacity threshold; and perform, based on the third determination, a second set of countermeasures affecting the capacity on the storage array.

12. The non-transitory CRM of claim 11, further comprising computer readable program code, which when executed by the computer processor, enables the computer processor to generate the first forecast time-series, by:
   parsing a system log to obtain a historical time-series recording a past consumption of capacity on the storage array spanning a specified time duration;
   partitioning the first forecast duration into a plurality of forecast duration intervals;
   for each forecast duration interval of the plurality of forecast duration intervals:
      estimating, for the forecast duration interval, a future consumption of capacity on the storage array using the historical time-series and a forecasting algorithm; and
   forming the first forecast time-series using the future consumption of capacity on the storage array for the plurality of forecast duration intervals in chronological order.

13. The non-transitory CRM of claim 11, wherein the first set of countermeasures comprises expiring a set of directory snapshots residing on the storage array.

14. The non-transitory CRM of claim 13, wherein the first set of countermeasures further comprises performing a data migration of cold data residing on the storage array.

15. The non-transitory CRM of claim 14, wherein the first set of countermeasures further comprises overriding a garbage collection schedule implemented on the storage array.

16. The non-transitory CRM of claim 11, wherein the second set of countermeasures comprises issuing an alert notification to an admin client.

17. The non-transitory CRM of claim 16, wherein the second set of countermeasures further comprises issuing a procurement order to a sales client.

18. A system, comprising:
   a storage array; and
   a computer processor operatively connected to the storage array, and configured to:
      generate a forecast time-series projecting a future consumption of capacity on the storage array spanning a forecast duration;
      identify a forecast time-series maximum of the forecast time-series;
      make a determination that the forecast time-series maximum exceeds a first used capacity threshold;
      perform, based on the determination, a set of countermeasures affecting a capacity on the storage array;
      generate a second forecast time-series projecting a second future consumption of capacity on the storage array spanning a second forecast duration;
      identify a second forecast time-series maximum of the second forecast time-series;
      make a second determination that the second forecast time-series maximum does not exceed the first used capacity threshold;
      make a third determination, based on the second determination, that the second forecast time-series maximum exceeds a second used capacity threshold; and
      perform, based on the third determination, a second set of countermeasures affecting the capacity on the storage array.

* * * * *